US007510312B2

(12) United States Patent
Li

(10) Patent No.: US 7,510,312 B2
(45) Date of Patent: Mar. 31, 2009

(54) LAMP STRUCTURE

(76) Inventor: Chin-Fu Li, 1F., No. 29, Alley 9, Lane 10, Daren St., Taipei County 235, Jhonghe City (TW)

(*) Notice: Subject to any disclaimer, the term of this patent is extended or adjusted under 35 U.S.C. 154(b) by 639 days.

(21) Appl. No.: 11/306,991

(22) Filed: Jan. 18, 2006

(65) Prior Publication Data

US 2007/0164678 A1 Jul. 19, 2007

(51) Int. Cl.
*B60Q 1/04* (2006.01)
*F21V 21/00* (2006.01)

(52) U.S. Cl. ........................ 362/538; 362/465; 362/508; 362/509; 362/512

(58) Field of Classification Search ................. 362/538, 362/539, 263, 465–468, 508, 509, 512–515, 362/549, 523, 257, 317
See application file for complete search history.

(56) References Cited

U.S. PATENT DOCUMENTS 5,357,407 A * 10/1994 Woods ........................ 362/508
6,866,407 B2 * 3/2005 Park ........................ 362/508
7,059,750 B2 * 6/2006 Suzuki ........................ 362/513
2003/0235056 A1 * 12/2003 Jong ........................ 362/512
2005/0281045 A1 * 12/2005 Jang ........................ 362/526

* cited by examiner

*Primary Examiner*—Bao Q Truong
(74) *Attorney, Agent, or Firm*—Alan Kamrath; Kamrath & Associates PA

(57) ABSTRACT

A lamp structure for adjusting light to be a high beam and a low beam has a sliding seat which comprises one end installed a lamp component and another end installed an annulate guiding groove on outer surface thereof, and the guiding groove comprises a first groove segment and a second groove segment, and the two groove segments have the same curvature; a lamp seat which comprises a first space for the sliding seat restricting in the first space, and a first through hole which is bored through the lamp seat into the first space and is according to the guiding groove of the sliding seat; and a restricting component comprises one end inserted in the first through hole of the lamp seat to trace the guiding groove for restricting the moving of the sliding seat.

9 Claims, 8 Drawing Sheets

LAMP STRUCTURE

BACKGROUND OF THE INVENTION

1. Field of the Invention

The present invention relates to a lamp structure, and in particular to a lamp structure for switching a low beam and a high beam.

2. The Related Art

Lamps of the prior arts are applied for transports, flashlights, and others, and some lamps have to switch a low beam and a high beam. It is help to improve traffic safety that users can light the near areas at the low beam state while they can light the far distance at the high beam state.

Because of improvement in recent technology, lamps with high-efficient illumination are reached and developed success successively, e.g. the discharge xenon lamps, and the ultra high light LED. These new types of lamps replace halogen lights gradually, and means for switching the low beam and the high beam is need. The prior arts disclose switching means that applies the electromagnet, and switches the low beam and the high beam by attraction effects and repulsion effects of the electromagnet. However, heat effects of the lamps or electromagnet operation also lead to decrease the efficient of electromagnet, and it damages traffic safety.

Moreover, reliability of the switching means of lamps is also important. It has to avoid the effects of bad roadway, sometimes likes that vibration of vehicles during the traveling may cause the switching means to work wrong.

Thus the present invention is aimed to provide a lamp structure that overcomes the drawbacks of the prior art by a button switch which allows switching the low beam and the high beam.

SUMMARY OF THE INVENTION

A primary objective of the present invention is to provide a lamp structure comprising a button switch which is operated by pushing the button switch to drive a projection of a sliding lamp seat guided by a guiding groove and a restricting component.

Another objective of the present invention is to provide the lamp structure to install at a lamp shell which comprises a cambered inner surface to reflect light emitted from the lamp seat, and switching the low beam and the high beam is reached.

In accordance with the present invention, to realize the above objectives, a lamp structure for adjusting light to be a high beam and a low beam has a sliding seat which comprises one end installed a lamp component and another end installed an annulate guiding groove on outer surface thereof, and the guiding groove comprises a first groove segment and a second groove segment, and the two groove segments have the same curvature; a lamp seat which comprises a first space for the sliding seat restricting in the first space, and a first through hole which is bored through the lamp seat into the first space and is according to the guiding groove of the sliding seat; and a restricting component comprises one end inserted in the first through hole of the lamp seat to trace the guiding groove for restricting the moving of the sliding seat. The first groove segment comprises a first position, a second position, and a third position, and the second groove segment comprises a forth position, a fifth position, and a sixth position. The second position, the third position, the forth position, and the fifth position are defined as a first stroke, and the fifth position, the sixth position, the first position, and the second position are defined as a second stroke. One end of the first stroke connected with one end of the second stroke is defined the second position, and the second position which the first stroke connects the second stroke second position has height difference. Another end of the first stroke connected with one end of the second stroke is defined the fifth position, and the fifth position which the second stroke connects the second stroke second position has height difference.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
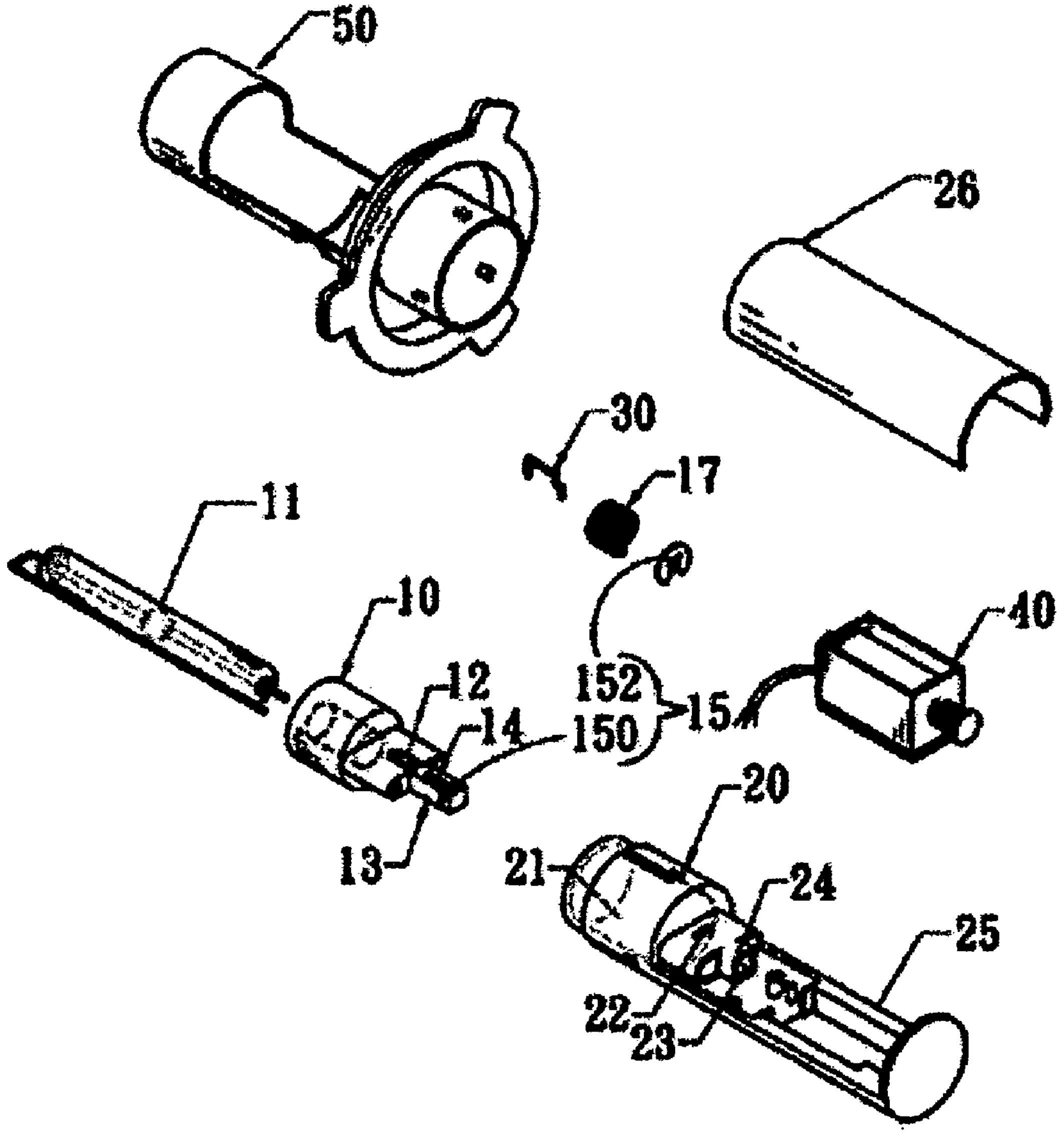
FIG. 1 is a perspective view of an embodiment of a lamp structure according to the present invention.
Figure 2:
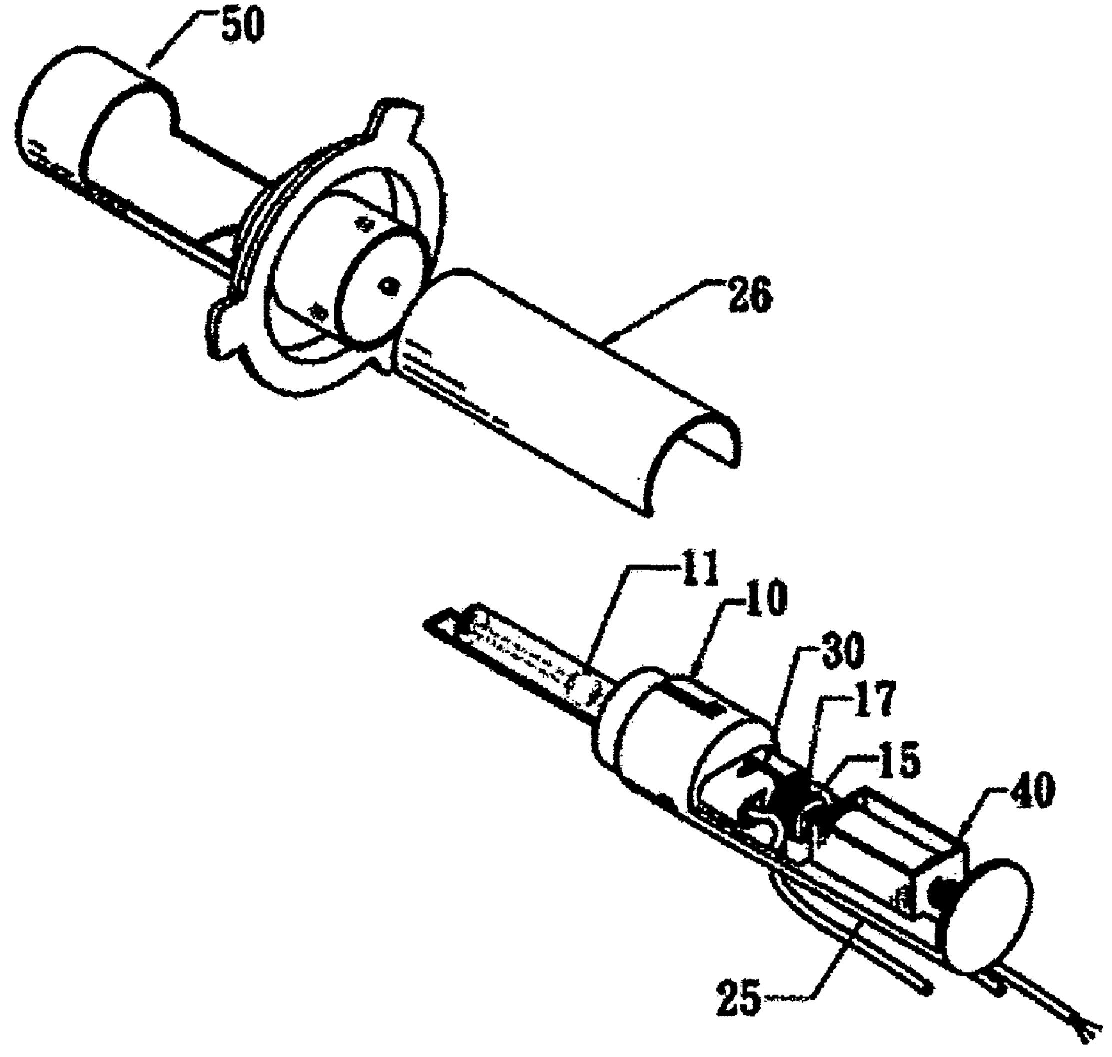
FIG. 2 is a perspective view composed partially of the lamp structure according to the present invention.
Figure 3:
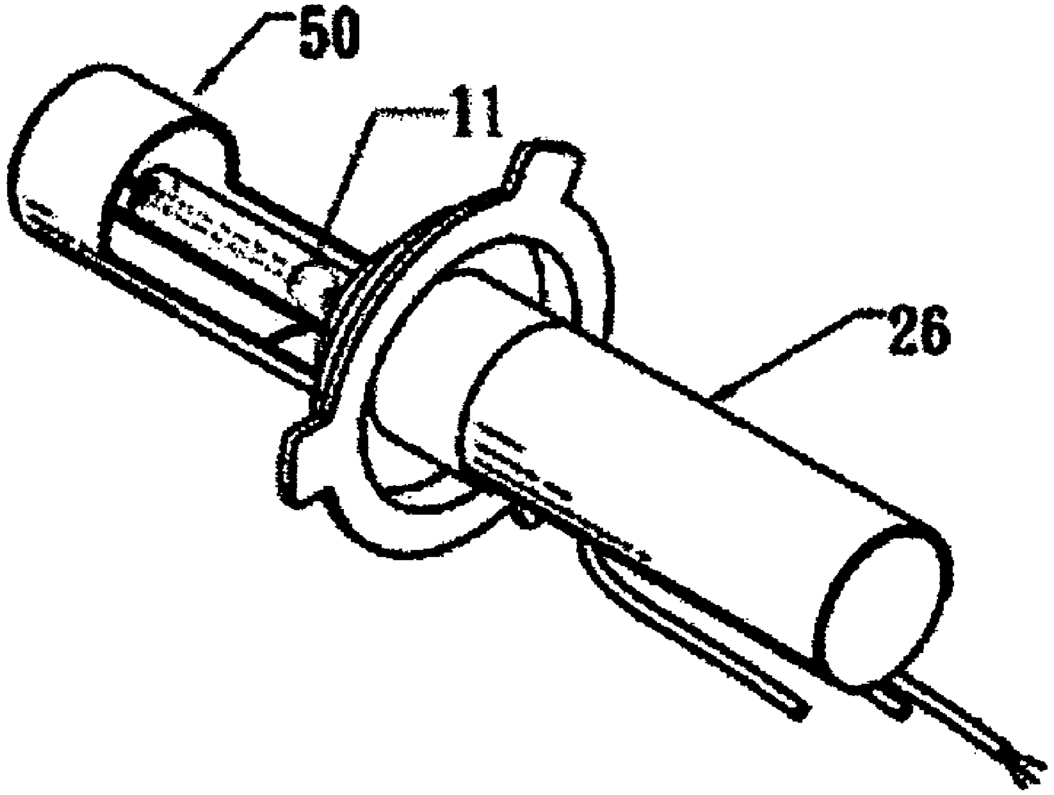
FIG. 3 is a perspective view composed fully of the lamp structure according to the present invention.

Referring to the drawings and in particular FIGS. 1, 2 and 3, FIG. 1 is a perspective view of an embodiment of a lamp structure according to the present invention, FIG. 2 is a perspective view composed partially of the lamp structure according to the present invention, and FIG. 3 is a perspective view composed fully of the lamp structure according to the present invention. The present invention is related to a lamp structure which include a sliding seat 10, a lamp seat 20, a restricting component 30, a button switch40, a conjugating seat 50, and a lamp shell 60. There are some detailed descriptions of the preferred embodiment about the present invention as follows.

Figure 4:
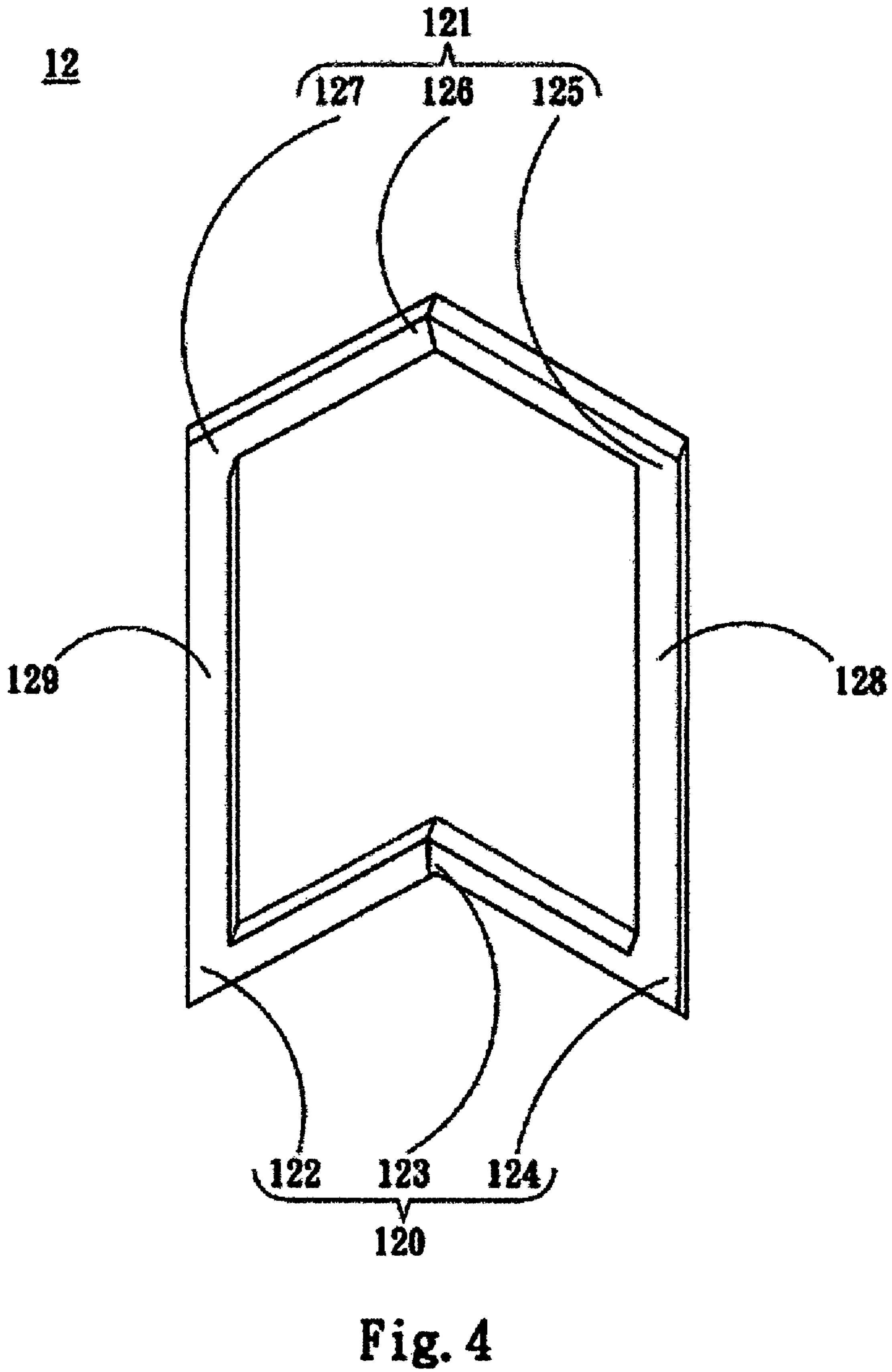
FIG. 4 is a vertical view of a guiding groove of the lamp structure according to the present invention.
Figure 5:
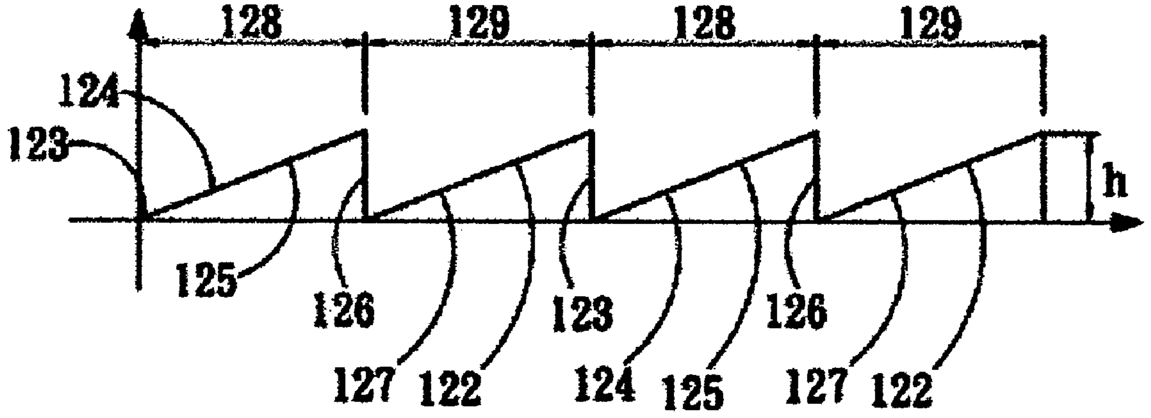
FIG. 5 is a sketch view of a guiding trace of the guiding groove in the FIG. 4 according to the present invention.

About the said lamp structure of the present invention, the sliding seat 10 has a lamp component 11 and a guiding groove 12. The lamp component 11 is embedded in one end of the sliding seat 10, and the guiding groove 12, an annulate groove, is formed at an outer face of another end of the sliding seat 10. The guiding groove 12 has a first groove segment 120 and a second groove segment 121, and the two groove segments have the same curvature. The first groove segment 120 has a first position 122, a second position 123, and a third position 124 while the second groove segment 121 has a forth position 125, a fifth position 126, and a sixth position 127. In the embodiment, a groove segment between the first position 122 and the sixth position 127 are parallel to another groove segment of the third position 124 and the forth position 125. A first stroke 128 is defined by the second position 123, the third position 124, the forth position 125, and the fifth position 126 while a second stroke 129 is defined by the fifth position 126, the sixth position 127, the first position 122, and the second position 123. Referring to the drawings and in particular FIGS. 4 and 5, the FIG. 4 is a vertical view of a guiding groove Of the lamp structure according to the present invention, and the FIG. 5 is a sketch view of a guiding trace of the guiding groove in the FIG. 4 according to the present invention. Two ends of the second stroke 129 are aligned with tow ends of the first stroke 128 in the horizontal direction so that the second stroke 129 and the first stroke 128 are connected at the second position 123 and the fifth position 126 respectively. The second stroke 129 and the first stroke 128 have height difference h along the depth direction at the second position 123 and the fifth position 126 respectively, and the guiding groove 12 has smoothly decreasing depth along the second stroke 128 from the second position 123 to the fifth position 126 while the guiding groove 12 has smoothly decreasing depth along the second stroke 129 from the fifth position 126 to the second position 123. The sliding seat 10 has a projection 13 at one end thereof, and the projection 13 has a slot 14 on the surface and has a stopping part 15 at an end thereof. The stopping part 15 is composed of a retaining slot 150 and a retaining ring 152 at the end of the projection 13.

Referring to the drawings and in particular FIGS. 1, 2 and 3 again, the lamp seat 20 is corresponding to the conjugating seat 50, and the lamp seat 20 has a first space 21 for restricting the sliding seat 10 to moving in the first space 21. The lamp seat 20 has a first through hole 22 bored through from the surface to the first space 21 and a second space 23 been axially through to the first space 21 from the end of the lamp seat 20. The first through hole 22 is corresponding to the guiding groove 12 on the sliding seat 10. The second space 23 restricts the sliding seat 10 to moving in the second space 23. The stopping part 15 at the end of the projection 13 is axially installed outside the second space 23, and an elastic component 17 provided elasticity is axially installed at a space which the first space 21 and the second space 23 composed and has one end restricted at the retaining ring 152 of the stopping part 15. The lamp seat 20 has a second through hole 24 according to the slot 14 of the sliding seat 10, and the second through hole 24 is bored through to the second space 23. The lamp seat 20 has a carrier 25, and the carrier 25 is extended from one end of the lamp seat 20 for placing a button switch 40. The carrier 25 has a cover 26 to cover an opening thereof. The button switch 40 is percussed while the button switch 40 is pushed. The button switch 40 is also installed near the projection 13 of the sliding seat 10, and the projection 13 is pushed while the button switch 40 is percussed.

The restricting component 30 has one end inserted in the first through hole 22 of the lamp seat 20 to trace the guiding groove 12 for restricting the moving of the sliding seat 10 and has another end inserted in the second through hole 24 of the lamp seat 20 to installed at the slot 14.

Figure 6:
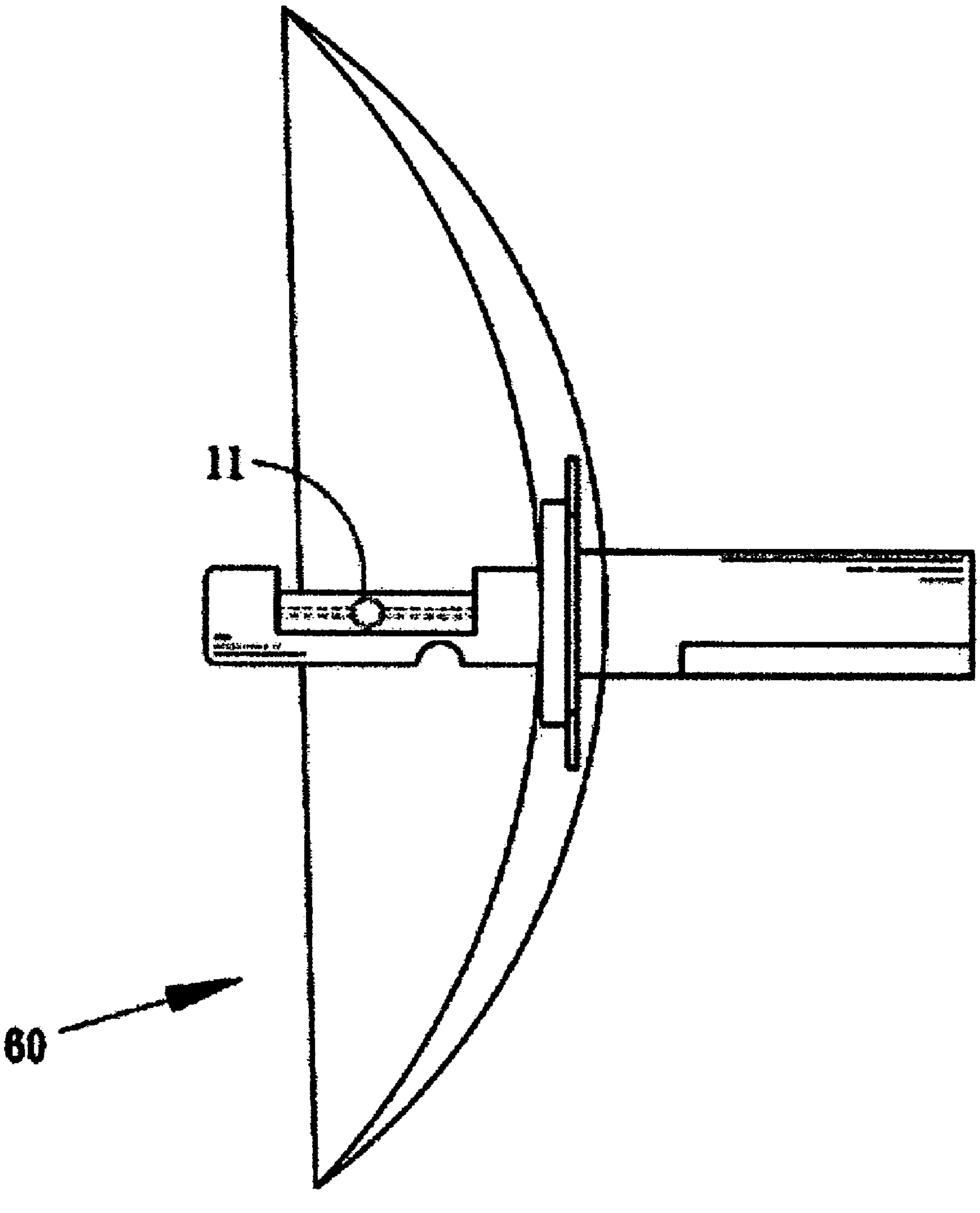
FIG. 6 is a lateral view of the lamp structure at a low beam state according to the present invention.
Figure 7:
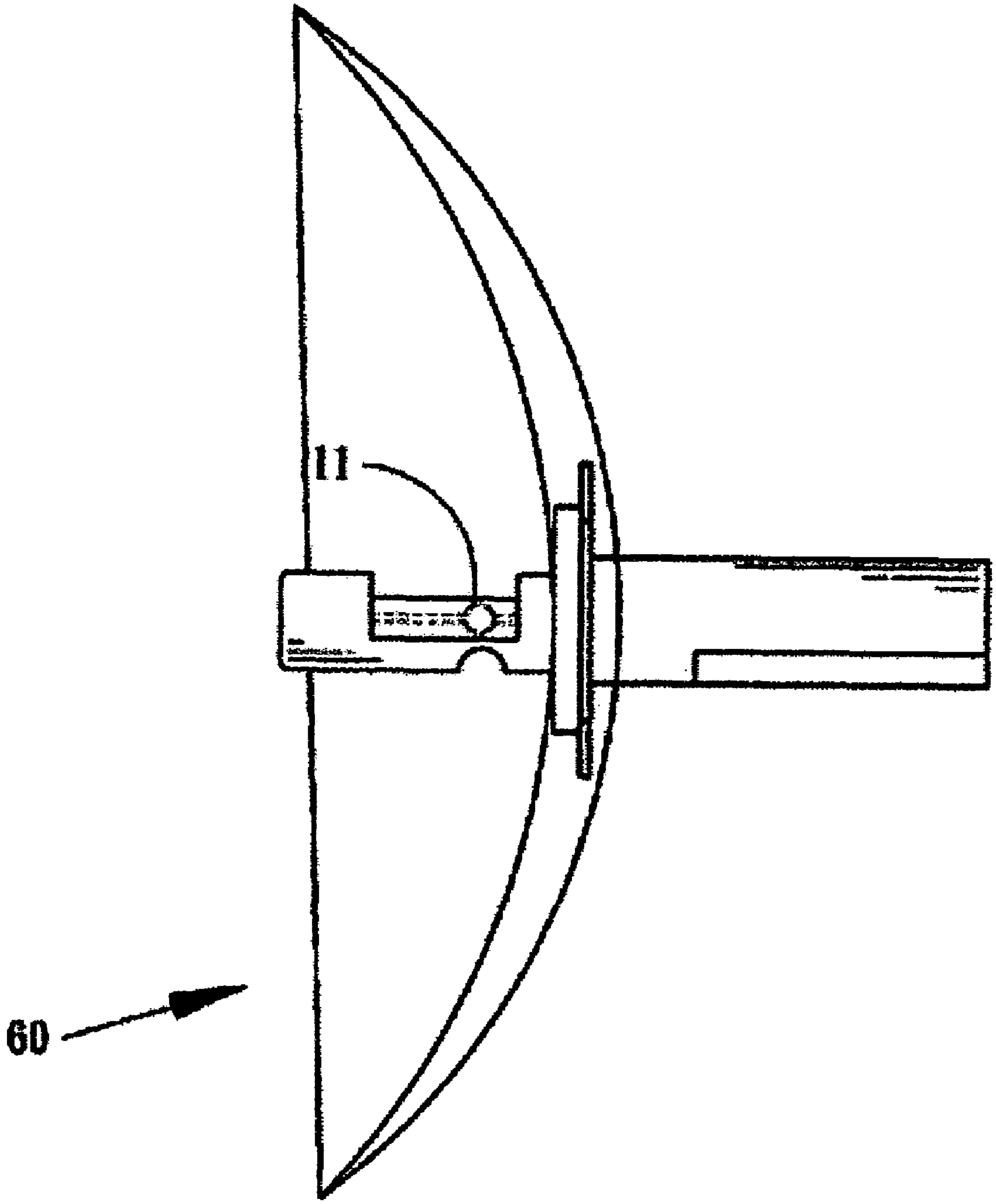
FIG. 7 is a lateral view of the lamp structure at a high beam state according to the present invention.

Referring to the drawings and in particular FIGS. 6 and 7, the FIG. 6 is a lateral view of the lamp structure at a low beam state according to the present invention, and the FIG. 7 is a lateral view of the lamp structure at a high beam state according to the present invention. The conjugating seat 50 is installed at the lamp shell 60 while the conjugating seat 50 is engaged with the lamp seat 20. The lamp shell 60 has a cambered inner surface to reflect light emitted from the lamp seat 20, and the cambered inner surface of the lamp shell 60 has a focus which the light reflected from the cambered inner surface is focused on. At the initial state, the lamp component 11 is stood aside to the focus so that light reflected from the cambered inner surface of the lamp shell 60 comes into being a low beam. The elastic component 17 restricted by the retaining ring 152 and installed in the second space 23 provides a restrained elasticity, and the elastic component 17 is compressed during a decreasing distance between the retaining ring 152 and the second space 23. The end of the restricting component 30, the end inserted in the guiding groove 14, is stood in the second position 123 which is one end of the first stroke 128 of the guiding groove 14. The end of the second stroke 129 and the end of the first stroke 128 have the height difference h so that the restricting component 30 is restricted at the second position 12.

The restricting component 30 moves from the second position 123 of the first stroke 128 to the third position 124 of the first stroke 128 while the button switch 40 is pushed to percusse the projection 13 for moving the restricting component 30. When the restricting component 30 moves to third position 124, the elastic component 17 provides the restrained elasticity for bringing the restricting component 30 moving through the forth position 125 to the fifth position 126. The fifth position 126 is a boundary at another connected position of the second stroke 129 and the first stroke 128, and the restricting component 30 can move through the first stroke 128 to the second stroke 129 and is restrained at the fifth position 126. Therefore, the light reflected from the cambered inner surface of the lamp shell 60 comes into being a high beam. If the button switch 40 is pushed to percusse the projection 13 again, the restricting component 30 moves along the second stroke 129 and through the fifth position 126, the sixth position 127, the first position 122, until to the second position 123. The restricting component 30 passes the second stroke 129 and is restrained at the first stroke 128 near by the second position 123.

Figure 8:
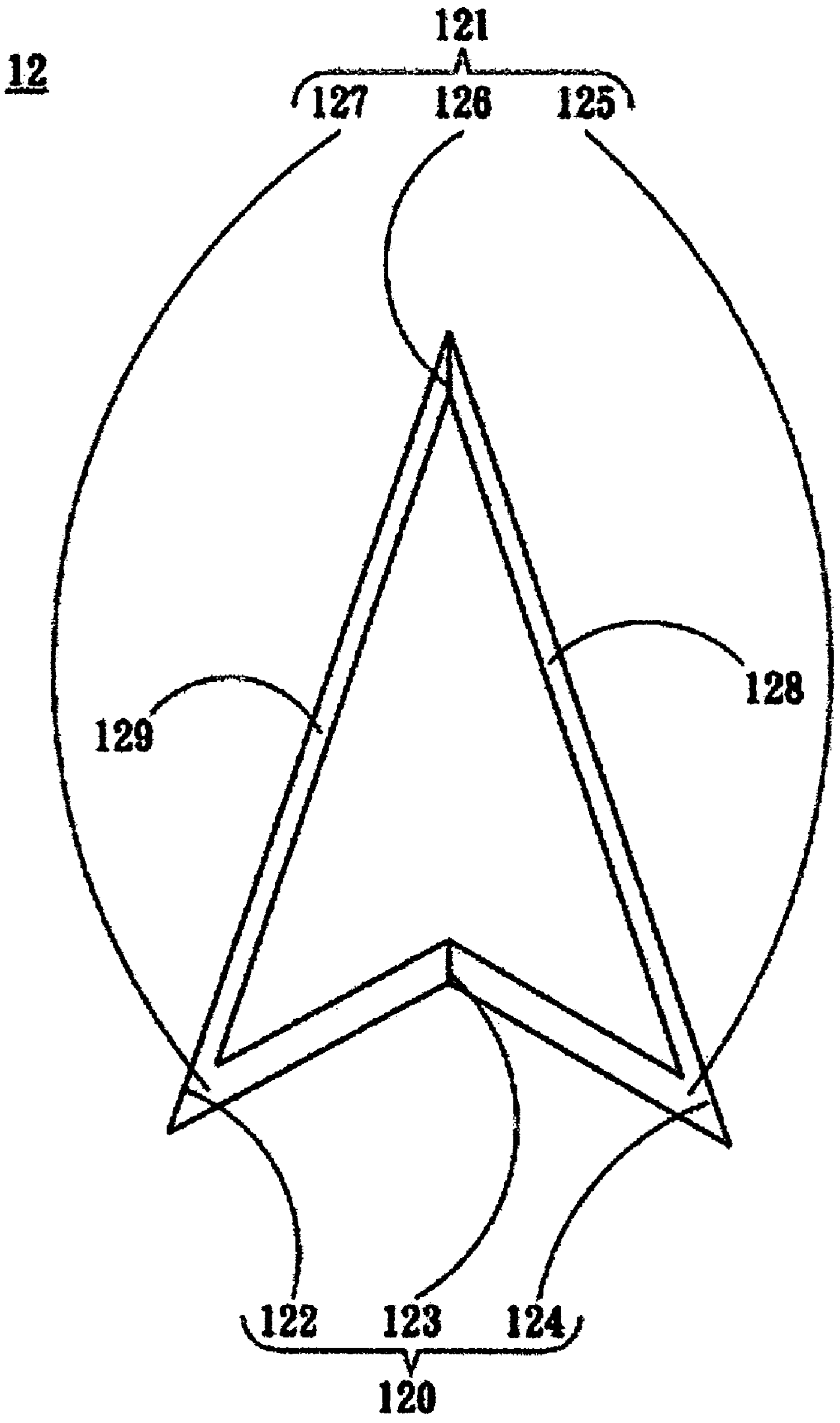
FIG. 8 is a lateral view of another embodiment of the lamp structure according to the present invention.

Referring to the drawings and in particular FIG. 8, another embodiment of the present invention is that the first position 122 and the sixth position 127 are reduced into one position while the first position 124 and the sixth position 125 are reduced into one position, too. Therefore, the operation of the present invention is more simply.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A lamp structure for adjusting light to be a high beam and a low beam, comprising:

a sliding seat which comprises one end installed a lamp component and another end installed an annulate guiding groove on outer surface thereof, and the guiding groove comprises a first groove segment and a second groove segment, and the two groove segments have the same curvature;

a lamp seat which comprises a first space for the sliding seat restricting in the first space, and a first through hole which is bored through the lamp seat into the first space and is according to the guiding groove of the sliding seat; and a restricting component comprises one end inserted in the first through hole of the lamp seat to trace the guiding groove for restricting the moving of the sliding seat;

wherein the first groove segment comprises a first position, a second position, and a third position, and the second groove segment comprises a forth position, a fifth position, and a sixth position;

the second position, the third position, the forth position, and the fifth position are defined as a first stroke, and the fifth position, the sixth position, the first position, and the second position are defined as a second stroke;

one end of the first stroke connected with one end of the second stroke is defined the second position, and the second position which the first stroke connects the second stroke second position has height difference; and another end of the first stroke connected with one end of the second stroke is defined the fifth position, and the fifth position which the second stroke connects the second stroke second position has height difference.

2. The lamp structure as claimed in claim 1, wherein a groove segment between the first position and the sixth position are parallel to another groove segment of the third position and the forth position.

3. The lamp structure as claimed in claim 1, wherein the first position and the sixth position are reduced into one position while the first position and the sixth position are reduced into one position.

4. The lamp structure as claimed in claim 1, wherein the sliding seat comprises a projection at one end thereof, and the projection comprises a stopping part at an end thereof; the lamp seat comprises a second space been axially through to the first space from the end of the lamp seat for restricting the projection to move in the second space; and an elastic component installed between the stopping part and the lamp seat provides a restrained elasticity.

5. The lamp structure as claimed in claim 4, wherein the projection comprises a slot on a surface thereof, and the lamp seat comprises a second through hole according to the slot for one end of the restricting component being inserted in the slot through the second through hole.

6. The lamp structure as claimed in claim 4, further comprises a button switch installed according to the projection.

7. The lamp structure as claimed in claim 5, further comprises a button switch installed according to the projection.

8. The lamp structure as claimed in claim 6, wherein the lamp seat is installed at a lamp shell which comprises a cambered inner surface to reflect light emitted from the lamp seat.

9. The lamp structure as claimed in claim 7, wherein the lamp seat is installed at a lamp shell which comprises a cambered inner surface to reflect light emitted from the lamp seat.

* * * * *